US011140021B2

(12) United States Patent
Pan et al.

(10) Patent No.: US 11,140,021 B2
(45) Date of Patent: Oct. 5, 2021

(54) METHOD AND APPARATUS FOR DETERMINING FAULT TYPE (71) Applicant: HUAWEI TECHNOLOGIES CO., LTD., Guangdong (CN)

(72) Inventors: Lujia Pan, Shenzhen (CN); Caifeng He, Shenzhen (CN); Jianfeng Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 22 days.

(21) Appl. No.: 16/351,033

(22) Filed: Mar. 12, 2019

(65) Prior Publication Data
US 2019/0215232 A1 Jul. 11, 2019

Related U.S. Application Data (63) Continuation of application No. PCT/CN2017/103506, filed on Sep. 26, 2017.

(30) Foreign Application Priority Data

Sep. 30, 2016 (CN) .......................... 201610867164.3

(51) Int. Cl.
H04L 12/24 (2006.01)
H04L 12/26 (2006.01)

(52) U.S. Cl.
CPC ........ *H04L 41/0636* (2013.01); *H04L 41/145* (2013.01); *H04L 41/16* (2013.01);
(Continued)

(58) Field of Classification Search
CPC ............. H04L 41/0636; H04L 43/0864; H04L 41/145; H04L 41/16; H04L 41/5025; H04L 41/5067; H04L 41/0631
See application file for complete search history.

(56) References Cited

U.S. PATENT DOCUMENTS 7,533,070 B2   5/2009 Guralnik et al.
7,600,007 B1 * 10/2009 Lewis .................... G06Q 10/04
                                                           709/223
(Continued)

FOREIGN PATENT DOCUMENTS

CN      1848602 A   10/2006
CN    101217693 A    7/2008
(Continued)

OTHER PUBLICATIONS

Office Action issued in Chinese Application No. 201610867164.3 dated Jul. 10, 2019, 6 pages.
(Continued)

*Primary Examiner* — Javier O Guzman
(74) *Attorney, Agent, or Firm* — Fish & Richardson P.C.

(57) ABSTRACT

This application discloses a method and an apparatus for determining a fault type. The method includes: performing online real-time calculation on operating data generated by each of a plurality of users within a preset period, to obtain an operating feature value corresponding to the operating data generated by each of the plurality of users within the preset period; receiving a fault classification request, where the fault classification request requests to determine a fault type of a fault that is caused for a target user before a target moment; and determining, according to the fault classification request, the fault type of the fault that is caused for the target user before the target moment based on a fault classification model and an operating feature value that is of the target user within at least one preset period.

15 Claims, 5 Drawing Sheets (52) U.S. Cl.
CPC ...... *H04L 41/5025* (2013.01); *H04L 41/5067* (2013.01); *H04L 43/0864* (2013.01)

(56) References Cited

U.S. PATENT DOCUMENTS

| | | | | |
|---|---|---|---|---|
| 2004/0117153 | A1* | 6/2004 | Siegel | H04L 41/16 702/183 |
| 2009/0164618 | A1* | 6/2009 | Kudo | H04L 43/065 709/223 |
| 2011/0199911 | A1 | 8/2011 | Ikada | |
| 2013/0198116 | A1* | 8/2013 | Bhamidipaty | G06F 3/04842 706/12 |
| 2015/0112903 | A1* | 4/2015 | Chan | G06F 16/9027 706/12 |
| 2015/0317197 | A1* | 11/2015 | Blair | H04L 41/147 714/47.3 |
| 2016/0266952 | A1 | 9/2016 | Fig et al. | |
| 2017/0353991 | A1* | 12/2017 | Tapia | H04L 41/147 |

FOREIGN PATENT DOCUMENTS

| | | | |
|---|---|---|---|
| CN | 101459925 | A | 6/2009 |
| CN | 101867486 | A | 10/2010 |
| CN | 101917297 | A | 12/2010 |
| CN | 101951630 | A | 1/2011 |
| CN | 102411106 | A | 4/2012 |
| CN | 102487343 | A | 6/2012 |
| CN | 103036649 | A | 4/2013 |
| CN | 103760901 | A | 4/2014 |
| CN | 103906112 | A | 7/2014 |
| CN | 104301156 | A | 1/2015 |
| CN | 104349366 | A | 2/2015 |
| CN | 104731083 | A | 6/2015 |
| CN | 104794136 | A | 7/2015 |
| CN | 105045256 | A | 11/2015 |
| CN | 105099791 | A | 11/2015 |
| CN | 105116872 | A | 12/2015 |
| CN | 105306246 | A | 2/2016 |
| CN | 106162710 | A | 11/2016 |

OTHER PUBLICATIONS

PCT International Search Report and Written Opinion issued in International Application No. PCT/CN2017/103506 dated Jan. 9, 2018, 21 pages (with English translation).

Office Action issued in Chinese Application No. 201610867164.3 dated Oct. 9, 2020, 4 pages.

* cited by examiner

100

┌─────────────────────────────────────────────────┐
│ Perform online real-time calculation on operating data │
│ generated by each of a plurality of users within a preset period, │ — 110
│ to obtain an operating feature value corresponding to the │
│ operating data generated by each user within the preset period │
└─────────────────────────────────────────────────┘
                          │
┌─────────────────────────────────────────────────┐
│ Receive a fault classification request, where the fault │
│ classification request is used to request to determine a fault type │ — 120
│ of a fault that is caused for a target user before a target moment, │
│ and the target user is any one of the plurality of users │
└─────────────────────────────────────────────────┘
                          │
┌─────────────────────────────────────────────────┐
│ Determine, based on a fault classification model and an │
│ operating feature value that is of the target user within at least │
│ one preset period, according to the fault classification request, │ — 130
│ the fault type of the fault that is caused for the target user │
│ before the target moment, where the fault classification model │
│ is obtained by performing training based on training data of a │
│ known fault type │
└─────────────────────────────────────────────────┘

METHOD AND APPARATUS FOR DETERMINING FAULT TYPE

CROSS-REFERENCE TO RELATED APPLICATIONS

This application is a continuation of International Application No. PCT/CN2017/103506, filed on Sep. 26, 2017, which claims priority to Chinese Patent Application No. 201610867164.3, filed on Sep. 30, 2016, The disclosures of the aforementioned applications are hereby incorporated by reference in their entireties.

TECHNICAL FIELD

This application relates to the data processing field, and more specifically, to a method and an apparatus for determining a fault type.

BACKGROUND

With continuous development of telecommunication network services in management and in technologies, types of the telecommunication network services are richer, and market competition is fiercer. Operators realize that network service quality needs to be measured based on user experience to improve satisfaction of a terminal user. Therefore, the operators and telecommunications device manufacturers specially set a series of indicators such as a Key Performance Indicator, KPI and a Key Quality Indicator, KQI, to evaluate network service quality for the user and an operating health status of a network device.

The KPI is intended for appraising user experience from a network's perspective, but cannot comprehensively reflect the network service quality. Usually, when the network service quality is measured by using a KPI system, KPIs of the entire network device are all in a good state, but user complaints gradually increase. To further improve the network service quality, the KQI is introduced to a network service quality evaluation system. The KQI is mainly used to provide service quality parameters conforming to user experience for different services. The KQI essentially reflects end-to-end service quality of some key services, such as fluency and definition of a video service, and synchronization between a voice and a video. The KQI improves the service quality of the key services to some extent, but the KQI still has some limitations. An indicator granularity of the KQI is relatively coarse, and the KQI is set in a fixed mode, and therefore the KQI cannot accurately describe service quality for the user in a complex and changeable use environment of the user.

In addition, to improve network experience of the user, the operators allow the user to make a complaint when the network experience is poor. How to quickly and accurately determine a crux of the poor network experience of the user when the user makes the complaint and to process the crux in time becomes a problem that the operators are devoted all along to resolve. The complaint—processing manner may bring better network experience to the user, so that both efficiency and quality of resolving a customer service problem by the operators are greatly improved, thereby reducing manual costs. When a problem that is complained about is a network problem, the complaint—processing manner may help an engineer quickly locate the problem and resolve the problem.

In an existing solution, when processing a complaint from a customer, a customer service representative of an operator queries a network fault bulletin based on a live network, terminal use information of the user, the KPI, the KQI, and the like, and determines a fault type for the user by virtue of experience of the customer service representative. Processing efficiency of this method mainly depends on professionalism of the customer service representative, and accuracy of a processing result cannot be stably ensured. In addition, the customer service representative also has experience limitations, and cannot accurately determine the problem.

Usually, an exception occurring on a network is reflected in an error reporting log of user data, or whether signaling information is successful or unsuccessful is identified in some fields in signaling data. Therefore, in another existing solution, when processing a complaint from a customer, a customer service representative of an operator analyzes error code carried in the error reporting log or the signaling data, to determine a fault type. When this solution is used to determine the fault type, the error code carried in the signaling data and the error code carried in the error reporting log are usually separately analyzed to determine a fault type for the complaining user. This solution still requires much manual intervention, and efficiency of determining a fault type is not high.

SUMMARY

This application provides a method and an apparatus for determining a fault type, to quickly determine, at low costs, a fault type of a fault caused for a user.

According to a first aspect, a method for determining a fault type is provided, and the method includes: performing online real-time calculation on operating data generated by each of a plurality of users within a preset period, to obtain an operating feature value corresponding to the operating data generated by each user within the preset period; receiving a fault classification request, where the fault classification request is used to request to determine a fault type of a fault that is caused for a target user before a target moment, and the target user is any one of the plurality of users; and determining, based on a fault classification model and an operating feature value that is of the target user within at least one preset period, according to the fault classification request, the fault type of the fault that is caused for the target user before the target moment, where the fault classification model is obtained by performing training based on training data of a known fault type.

According to the method for determining a fault type in the first aspect, online real-time calculation is performed on the operating feature value of the operating data generated by the user, and when a user complaint is received, matching is performed between the operating feature value and the fault classification model to determine the fault type of the fault caused for the user. The procedure is online, a processing speed is high, and manual costs are low.

With reference to the first aspect, in a first possible implementation of the first aspect, the performing online real-time calculation on operating data generated by each of a plurality of users within a preset period, to obtain an operating feature value corresponding to the operating data generated by each user within the preset period includes: obtaining the operating data generated by each user within the preset period, where the operating data includes at least one of signaling-plane operating data and user-plane operating data; determining an operating data sequence based on the operating data, where the operating data sequence includes at least one of a signaling operating data sequence corresponding to the signaling-plane operating data and a user operating data sequence corresponding to the user-plane operating data; and determining, based on the operating data sequence and a sequence feature set, the operating feature value corresponding to the operating data. In the first possible implementation, the signaling-plane operating data and the user-plane operating data that are generated by the user on a network are captured, and exception information included in time sequence patterns of the two types of data may be used to determine the fault type, so that accuracy of determining the fault type can be improved.

With reference to the first aspect, in a second possible implementation of the first aspect, the method further includes: obtaining the training data, where the training data includes at least one of signaling-plane training data and user-plane training data; determining a training data sequence based on the training data, where the training data sequence includes at least one of a signaling training data sequence corresponding to the signaling-plane training data and a user training data sequence corresponding to the user-plane training data; determining, based on the training data sequence and a sequence feature set, a training feature value corresponding to the training data; and determining the fault classification model based on the training feature value and the fault type that is corresponding to the training data.

With reference to the first possible implementation of the first aspect, in a third possible implementation of the first aspect, the method further includes: obtaining the training data, where the training data includes at least one of signaling-plane training data and user-plane training data; determining a training data sequence based on the training data, where the training data sequence includes at least one of a signaling training data sequence corresponding to the signaling-plane training data and a user training data sequence corresponding to the user-plane training data; determining, based on the training data sequence and the sequence feature set, a training feature value corresponding to the training data; and determining the fault classification model based on the training feature value and the fault type that is corresponding to the training data.

With reference to any one of the first to the third possible implementations of the first aspect, in a fourth possible implementation of the first aspect, the sequence feature set includes at least one of a mined sequence feature set and a predefined sequence feature set.

With reference to the fourth possible implementation of the first aspect, in a fifth possible implementation of the first aspect, when the sequence feature set includes the mined sequence feature set, the method further includes: performing sequence mining calculation on the training data sequence to obtain the mined sequence feature set.

With reference to the fifth possible implementation of the first aspect, in a sixth possible implementation of the first aspect, the performing sequence mining calculation on the training data sequence to obtain the mined sequence feature set includes: determining a plurality of training data subsequences based on the training data sequence; and performing sequence mining calculation on the plurality of training data subsequences by using a sequence mining algorithm, and determining a mined training data subsequence as an element in the mined sequence feature set.

With reference to the sixth possible implementation of the first aspect, in a seventh possible implementation of the first aspect, the sequence mining algorithm includes at least one of a decision tree algorithm and a model-based search tree MBT algorithm.

With reference to any one of the first aspect and the first to the seventh possible implementations of the first aspect, in an eighth possible implementation of the first aspect, the determining, based on a fault classification model and an operating feature value that is of the target user within at least one preset period, according to the fault classification request, the fault type of the fault that is caused for the target user before the target moment includes: obtaining, based on the target moment, a plurality of operating feature values of the target user separately corresponding to a plurality of preset periods before the target moment; reconstructing the plurality of operating feature values to obtain a reconstructed feature value; and performing feature matching between the reconstructed feature value and the fault classification model to determine the fault type of the fault that is caused for the target user before the target moment.

According to a second aspect, an apparatus for determining a fault type is provided, including a real-time feature calculation module, a receiving module, and a fault classification module, configured to implement corresponding functions in the first aspect and the possible implementations of the first aspect. The modules may be implemented by hardware, or may be implemented by hardware executing corresponding software. The apparatus for determining a fault type may further include an offline modeling module, to implement a corresponding implementation.

It should be understood that the modules of the apparatus for determining a fault type in the second aspect may be configured to implement the method in the first aspect and the possible implementations of the first aspect. Details are not described herein again.

According to a third aspect, an apparatus for determining a fault type is provided, including a processor, a network interface, and a memory. The memory may be configured to store code executed by the processor. The apparatus for determining a fault type may further include an output device or an output interface connected to the output device, to output a fault classification result.

It should be understood that the sequence feature set is a set of a plurality of features that are capable of representing a fault type.

DESCRIPTION OF EMBODIMENTS

The following describes the technical solutions of this application with reference to accompanying drawings.

A majority of existing methods for determining a fault type are manually performed. Therefore, an embodiment of this application provides a method for conveniently and quickly determining a fault type online. In the method for determining a fault type in this embodiment of this application, network quality for a user using a network service (for example, a mobile broadband (Mobile Broadband, MBB) network) can be accurately evaluated, and the network quality for the user can be described with reference to a characteristic and a use habit of the user. In the method for determining a fault type in this embodiment of this application, a fault type of a network quality problem caused for a complaining user can be further quickly determined, to assist a customer service representative in quickly resolving the problem.

Figure 1:
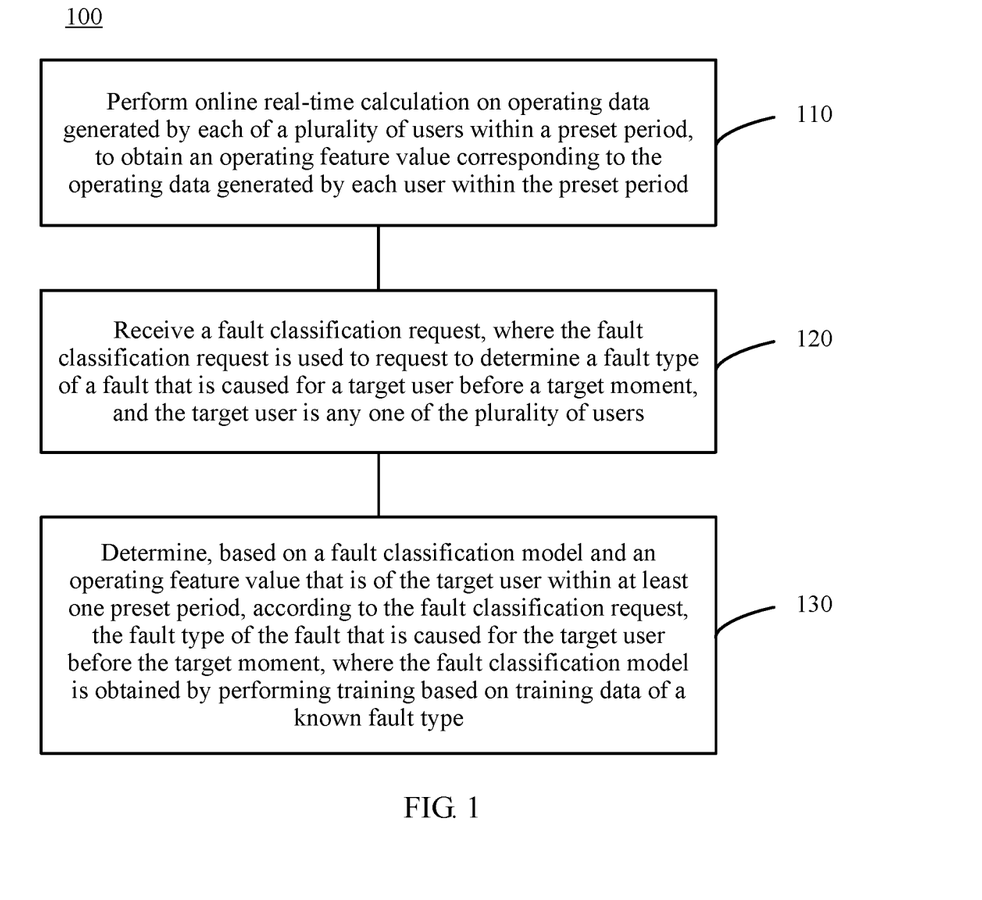
FIG. 1 is a schematic flowchart of a method for determining a fault type according to an embodiment of this application.

A method 100 for determining a fault type in an embodiment of this application may include the following steps shown in FIG. 1.

Step 110: Perform online real-time calculation on operating data generated by each of a plurality of users within a preset period, to obtain an operating feature value corresponding to the operating data generated by each user within the preset period.

S120: Receive a fault classification request, where the fault classification request is used to request to determine a fault type of a fault that is caused for a target user before a target moment, and the target user is any one of the plurality of users.

S130: Determine, based on a fault classification model and an operating feature value that is of the target user within at least one preset period, according to the fault classification request, the fault type of the fault that is caused for the target user before the target moment, where the fault classification model is obtained by performing training based on training data of a known fault type.

Figure 2:
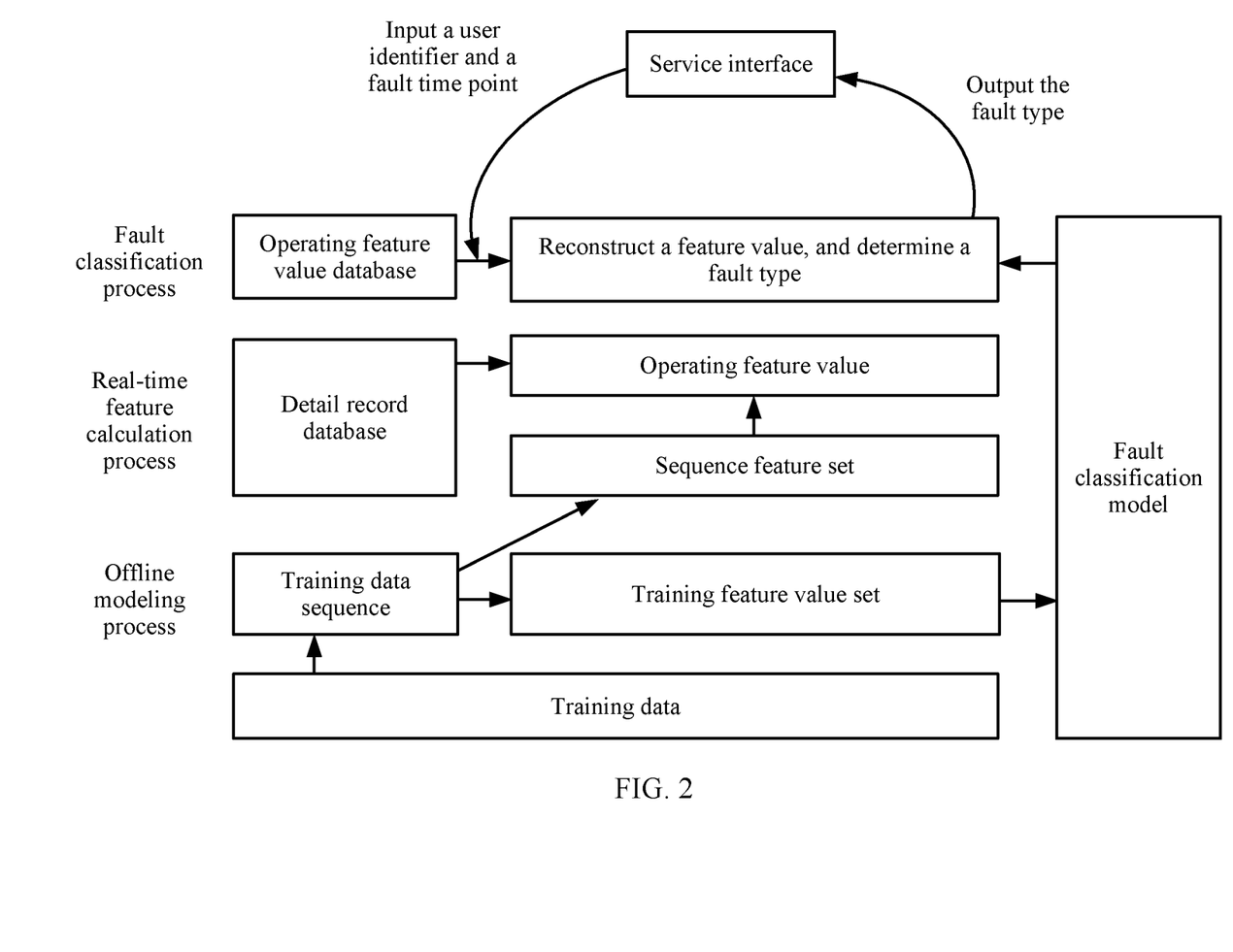
FIG. 2 is a schematic flowchart of a method for determining a fault type according to another embodiment of this application.

Specifically, the method for determining a fault type in this embodiment of this application may be shown in FIG. 2. S110 shown in FIG. 1 may be considered as a real-time feature calculation process shown in FIG. 2. For real-time feature calculation, original data does not need to be stored, and only a small amount of feature value data needs to be stored. Therefore, storage space can be reduced, and an end-to-end query time period can be reduced in a real-time processing process.

S110 may specifically include: obtaining the operating data generated by each user within the preset period, where the operating data includes at least one of signaling-plane operating data and user-plane operating data; determining an operating data sequence based on the operating data, where the operating data sequence includes at least one of a signaling operating data sequence corresponding to the signaling-plane operating data and a user operating data sequence corresponding to the user-plane operating data; and determining, based on the operating data sequence and a sequence feature set, the operating feature value corresponding to the operating data.

In this embodiment of this application, the sequence feature set is a set of a plurality of features that are capable of representing a fault type. Specifically, the sequence feature set may be manually selected based on experience or may be preset, or may be mined by using the following method in this embodiment of this application, and is a set of a plurality of features that are capable of being used for distinguishing during fault classification.

In an actual operating process of a network, each user generates a large amount of operating data. For example, in a Hadoop distributed file system (Hadoop Distributed File System, HDFS), the operating data is stored in a detail record database. Network quality for the user may be analyzed from the operating data. The operating data may include at least one of the signaling-plane operating data and the user-plane operating data. Therefore, the signaling-plane operating data and the user-plane operating data that are generated by the user on the network are captured in S110, and exception information included in time sequence patterns of the two types of data may be used to determine the fault type, so that accuracy of determining the fault type can be improved.

According to the method for determining a fault type in this embodiment of this application, a real-time feature calculation module in an apparatus for determining a fault type may obtain operating data generated by each user within a latest preset period from the detail record database based on the preset period. In other words, the apparatus for determining a fault type obtains the operating data generated by each user within the preset period.

It should be understood that the preset period may be determined by a network system based on calculation performance of the system or based on operating data generated by the system, or may be set by a network manager. The preset period may be a fixed value, or may flexibly change as a network environment changes. This is not limited in this embodiment of this application. In a specific example, the preset period may be five minutes or 10 minutes.

After obtaining the operating data, the real-time feature calculation module determines the operating data sequence based on the operating data. As mentioned above, the operating data may include at least one of the signaling-plane operating data and the user-plane operating data. Therefore, correspondingly, the determined operating data sequence may also include at least one of the signaling operating data sequence corresponding to the signaling-plane operating data and the user operating data sequence corresponding to the user-plane operating data. A specific process of determining the signaling operating data sequence based on the signaling-plane operating data and a specific process of determining the user operating data sequence based on the user-plane operating data are described below in detail.

After obtaining the operating data sequence, the real-time feature calculation module may determine, based on the operating data sequence and the sequence feature set, the operating feature value corresponding to the operating data. The sequence feature set is used to describe a feature format and a feature calculation rule. The sequence feature set may include at least one of a mined sequence feature set and a predefined sequence feature set. The predefined sequence feature set may be a manually predefined sequence feature set, and the mined sequence feature set may be a sequence feature set learned by a machine by using a mining algorithm. Generation and specific content of the mined sequence feature set are described below in detail. Specifically, when the sequence feature set includes the mined sequence feature set, the method for determining a fault type in this embodiment of this application may further include: performing mining calculation on a training data sequence to obtain the mined sequence feature set.

An example of an operating feature value of a user obtained in the real-time feature calculation process is described below by using Table 1.

TABLE 1

Example of the operating feature value

| Number | Element in a sequence feature set | Feature value |
|---|---|---|
| 1 | {26100} | 1 |
| 2 | {11000, 11000, 32017} | 0 |
| 3 | {A1, A2} | 1 |
| 4 | {B1, C2, E2} | 1 |
| 5 | Packet loss quantity | 23 |
| 6 | Average delay | 12 |

The operating feature value of the user shown in Table 1 includes two parts: a predefined feature value and a mined sequence feature value. The numbers 1 to 4 are mined sequence feature values, the numbers 1 and 2 are sequence feature values corresponding to the signaling operating data sequence, and the numbers 3 and 4 are sequence feature values corresponding to the user operating data sequence. The numbers 5 and 6 are predefined sequence feature values. It should be understood that, for different users and calculation periods, sequence feature values change as operating data changes.

The real-time feature calculation module stores, in an operating feature value database, a plurality of operating feature values of the target user separately corresponding to a plurality of preset periods and that are obtained through calculation, so that the operating feature values are used in a fault classification process.

S120 shown in FIG. 1 may be considered as an input process shown in FIG. 2. The apparatus for determining a fault type in this embodiment of this application may receive a fault classification request that is entered by a complaining user by using a page or the like. Alternatively, a customer service representative may participate in this process, and enter, by using a service page, a fault classification request to the apparatus for determining a fault type. The fault classification request may include a user identifier of the complaining user and a fault time point reflected by the complaining user. The apparatus for determining a fault type determines the user corresponding to the user identifier as the target user, and determines the target moment based on the fault time point, to perform subsequent processing. Certainly, the customer service representative may also participate in this process, and enter, by using a service page, the target moment and the user identifier of the target user to the apparatus for determining a fault type.

S130 shown in FIG. 1 may be considered as a fault classification process shown in FIG. 2. Specifically, when the network quality is poor, the user may feed back a problem of poor network quality by using a customer service web interface, a customer service application (APP) interface, or a customer service phone number. S130 may specifically include: obtaining, based on the target moment, a plurality of operating feature values of the target user separately corresponding to a plurality of preset periods before the target moment; reconstructing the plurality of operating feature values to obtain a reconstructed feature value; and performing feature matching between the reconstructed feature value and the fault classification model to determine the fault type of the fault that is caused for the target user before the target moment.

The plurality of operating feature values of the target user separately corresponding to a plurality of preset periods before the target moment are obtained based on the target moment. Specifically, the target moment may be determined based on the fault time point mentioned above and a period of time before or after the fault time point. A length of a period of time for obtaining the operating data may be determined by using the following method. For example, a time point at which the target user complains about a fault is 2016-5-26 14:00, and the fault time point is determined as the target moment. Therefore, when the operating data is being obtained, operating data of the user from 2016-5-25 14:00 to 2016-5-26 14:00 may be obtained, and the length of the period of time is 24 hours. The length of the period of time may be adjusted for different applications.

The target user is corresponding to the plurality of operating feature values within the plurality of preset periods. The plurality of operating feature values are reconstructed to obtain the reconstructed feature value. The reconstruction process may be simply accumulating, merging, or combining the plurality of operating feature values, for example, accumulating packet loss quantities generated within the plurality of preset periods; or performing a more complex operation on the plurality of operating feature values, for example, obtaining a maximum value or filtering the operating feature values according to a preset rule. This is not limited in this embodiment of this application.

In a specific example, because an operating feature value corresponding to each preset period is obtained through online real-time calculation, if the preset period for calculating the operating feature value online is set to five minutes, operating feature values generated by the user within 24 hours include 288 records. After the 288 records are obtained, the 288 records need to be reconstructed as one reconstructed feature value.

It should be understood that, in this embodiment of this application, feature matching may be performed between the reconstructed feature value (obtained by using the plurality of operating feature values) or one operating feature value and the fault classification model, to determine the fault type of the fault that is caused for the target user. The fault classification model may be preconfigured by the apparatus, or may be obtained by performing training based on the training data of the known fault type. A specific process of obtaining the fault classification model is described below in detail. The process may be referred to as an offline modeling process in FIG. 2, and may be performed by an offline modeling module in an apparatus for determining a fault type.

Usually, the offline modeling process may be performed before steps S110 to S130 of the method 100 for determining a fault type in this embodiment of this application. That is, the method 100 may further include: obtaining the training data, where the training data includes at least one of signaling-plane training data and user-plane training data; determining a training data sequence based on the training data, where the training data sequence includes at least one of a signaling training data sequence corresponding to the signaling-plane training data and a user training data sequence corresponding to the user-plane training data; determining, based on the training data sequence and the sequence feature set, a training feature value corresponding to the training data; and determining the fault classification model based on the training feature value and the fault type that is corresponding to the training data.

A process of obtaining the training data may be as follows: User identifiers of a batch of historical complaining users are obtained from the outside, where time points of faults caused for these complaining users and fault types are known, and these fault types are verified to be correct. Based on the user identifiers of the historical complaining users and the fault time points, operating data of the historical complaining users that is within a period of time before the fault time points is extracted from the detail record database as the training data.

Then, the training feature value is obtained based on the training data. This process is consistent with the foregoing described process of obtaining the operating feature value based on the operating data. Herein, an example of obtaining the training feature value based on the training data is used for description.

On one hand, if the sequence feature set includes the predefined sequence feature set, a predefined feature value may be obtained based on the training data. Elements in the predefined sequence feature set may include a packet loss rate, a transmission rate, an average delay, another indicator, and the like. Specifically, the predefined feature value may be directly obtained from the training data, or may be extracted from the training data sequence after the training data sequence is generated by preprocessing the training data. This is not limited in this embodiment of this application.

On the other hand, if the sequence feature set includes the mined sequence feature set, the training data may be preprocessed to obtain the training data sequence. Based on content included in the training data, the training data sequence may include at least one of the signaling training data sequence corresponding to the signaling-plane training data and the user training data sequence corresponding to the user-plane training data.

A specific process of generating the signaling training data sequence and a specific process of generating the user training data sequence are described below in detail.

For the signaling-plane training data, fields such as a signaling type, a signaling status, and a network standard are selected from the signaling-plane training data, and are arranged in a chronological order. Table 2 shows a format of signaling-plane training data obtained after the foregoing fields are extracted.

TABLE 2

Format of the signaling-plane training data obtained after the fields are extracted

| User identifier | Time | Signaling type | Signaling status | Network standard |
|---|---|---|---|---|
| User 1 | 12:01 | 000 | 1 | 1 |
| User 1 | 12:02 | 000 | 1 | 1 |
| User 1 | 12:03 | 017 | 3 | 2 |
| User 1 | 12:04 | 100 | 2 | 6 |

Encoding and reconstitution are performed in a chronological order based on the format, in Table 2, of the signaling-plane training data obtained after the fields are extracted, in other words, data sequencing processing is performed to obtain a signaling training data sequence 11000, 11000, 32017, 26100.

For the user-plane training data, some fields are selected from the user-plane training data to obtain a format, shown in Table 3, of user-plane training data obtained after the fields are extracted.

TABLE 3

Format of the user-plane training data obtained after the fields are extracted

| User identifier | Field 1 GET_NUM | Field 2 GET_FST_FAILED_CODE | Field 3 AVG_UL_RTT | Field 4 PAGE_SUCCEED_FLAG |
|---|---|---|---|---|
| User 1 | 208 | 10402 | 819 | 0 |
| User 1 | 209 | 10403 | 82 | 0 |
| User 1 | 21 | 10405 | 820 | 1 |
| User 1 | 210 | 200 | 821 | 0 |
| User 1 | 211 | 201 | 822 | 1 |

Figure 3:
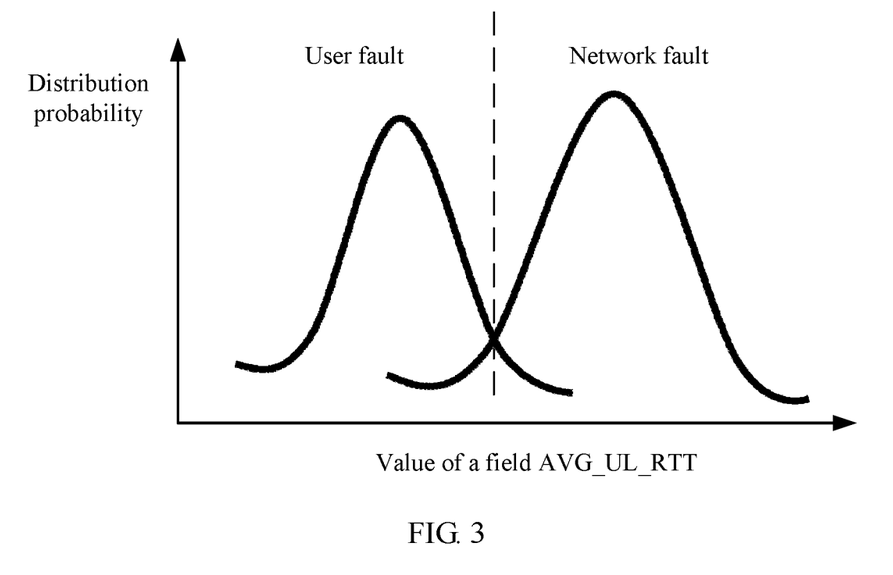
FIG. 3 is a schematic diagram of a correspondence between a value distribution of a field AVG_UL_RTT and a fault type possibly corresponding to the field AVG_UL_RTT according to an embodiment of this application.

As shown in Table 3, values of some fields (such as the field 1, the field 2, and the field 3) in Table 3 are numerical, and are not suitable for being sequenced. Discretization processing needs to be performed to change the values of the fields into category data. For example, a value of the field 3 (AVG_UL_RTT) is numerical. FIG. 3 is a schematic diagram of a correspondence between a value of a field AVG_UL_RTT and a fault type possibly corresponding to the field AVG_UL_RTT. Based on the correspondence, values of AVG_UL_RTT may be classified into AVG_UL_RTT_High and AVG_UL_RTT_Low. Therefore, the numerical values of AVG_UL_RTT are converted into category data. Similarly, values of the field 1 (GET_NUM) may be converted into category data GET_NUM_High or GET_NUM_Low, and values of the field 2 (GET_FST_FAILED_CODE) may be converted into category data GET_FST_FAILED_CODE_Range1, GET_FST_FAILED_CODE_Range2, . . . , GET_FST_FAILED_CODE_Range6 . . . .

After conversion is performed for Table 3, a format, shown in Table 4, of the user-plane training data obtained after the fields are extracted is obtained.

TABLE 4

Format of the user-plane training data obtained after the fields are extracted

| User identifier | Field 1 GET_NUM | Field 2 GET_FST_FAILED_CODE | Field 3 AVG_UL_RTT | Field 4 PAGE_SUCCEED_FLAG |
|---|---|---|---|---|
| User 1 | GET_NUM_High | GET_FST_FAILED_CODE_Range6 | AVG_UL_RTT_High | 0 |
| User 1 | GET_NUM_High | GET_FST_FAILED_CODE_Range6 | AVG_UL_RTT_Low | 0 |
| User 1 | GET_NUM_Low | GET_FST_FAILED_CODE_Range6 | AVG_UL_RTT_High | 1 |
| User 1 | GET_NUM_High | GET_FST_FAILED_CODE_Range1 | AVG_UL_RTT_High | 0 |
| User 1 | GET_NUM_High | GET_FST_FAILED_CODE_Range1 | AVG_UL_RTT_High | 1 |

After the content shown in Table 4 is obtained through conversion, the foregoing content is also arranged in a chronological order to obtain a user training data sequence ({GET_NUM_High, GET_FST_FAILED_CODE_Range6, AVG_UL_RTT_High, 0}, {GET_NUM_High, GET_FST_FAILED_CODE_Range6, AVG_UL_RTT_Low 0}, . . . ).

Therefore, the training data sequence (including at least one of the signaling training data sequence and the user training data sequence) of each user is obtained. Matching is performed between the training data sequence of each user and elements in the sequence feature set. If the element identifier 1 exists in the training data sequence, and the element identifier 0 does not exist in the training data sequence, a set of these identifiers (0 or 1) forms the training feature value corresponding to the training data. The set may also be referred to as a training feature value set. How to obtain the sequence feature set is described below in detail.

The fault type of the training data is known. By using the signaling training data sequence listed above as an example, Table 5 shows an example of a correspondence between training feature values of a plurality of users and fault types for the plurality of users. For example, the sequence feature set may include the following elements:

{26100} and {11000, 11000, 32017}.

TABLE 5

Correspondence between the training feature values of the plurality of users and the fault types for the plurality of users

| User identifier | Element 1 in the sequence feature set {26100} | Element 2 in the sequence feature set {11000, 11000, 32017} | ... | Fault type |
|---|---|---|---|---|
| User 1 | 1 | 1 | | Network fault |
| User 2 | 0 | 0 | | User fault |
| User 3 | 1 | 0 | | Network fault |
| User 4 | ... | ... | ... | Network fault |

Figure 4:
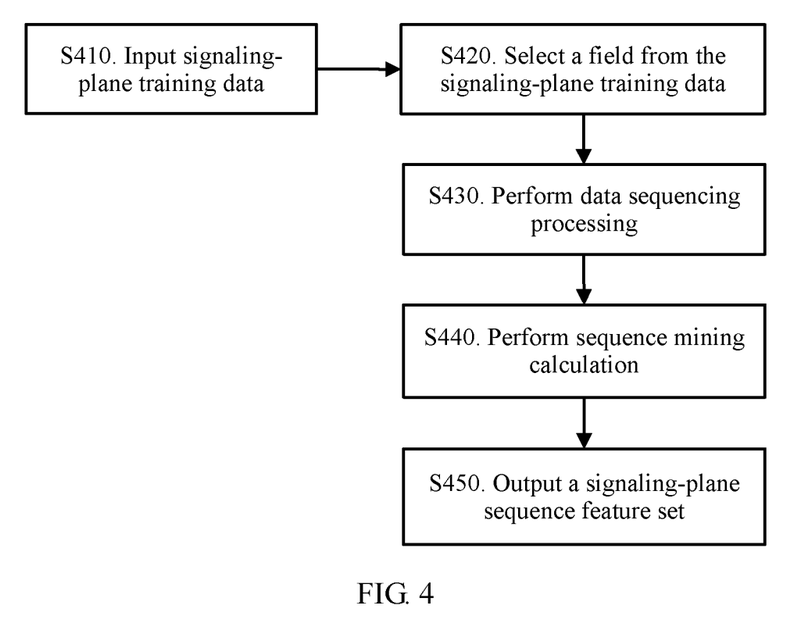
FIG. 4 is a schematic flowchart of obtaining a signaling-plane sequence feature set according to an embodiment of this application.

Specifically, signaling-plane training data is processed and mined to finally obtain a signaling-plane sequence feature set. FIG. 4 is a schematic flowchart of obtaining a signaling-plane sequence feature set. The procedure may specifically include the following steps:

S410: Input signaling-plane training data to obtain a signaling-plane sequence feature set.

S420: Select a field from the signaling-plane training data by using the method described above.

S430: Perform data sequencing processing by using the method described above, to obtain a signaling training data sequence.

S440: Perform sequence mining calculation on the signaling training data sequence to obtain the signaling-plane sequence feature set, where the sequence mining calculation herein may be single-dimension sequence mining.

S450: Output the signaling-plane sequence feature set.

Figure 5:
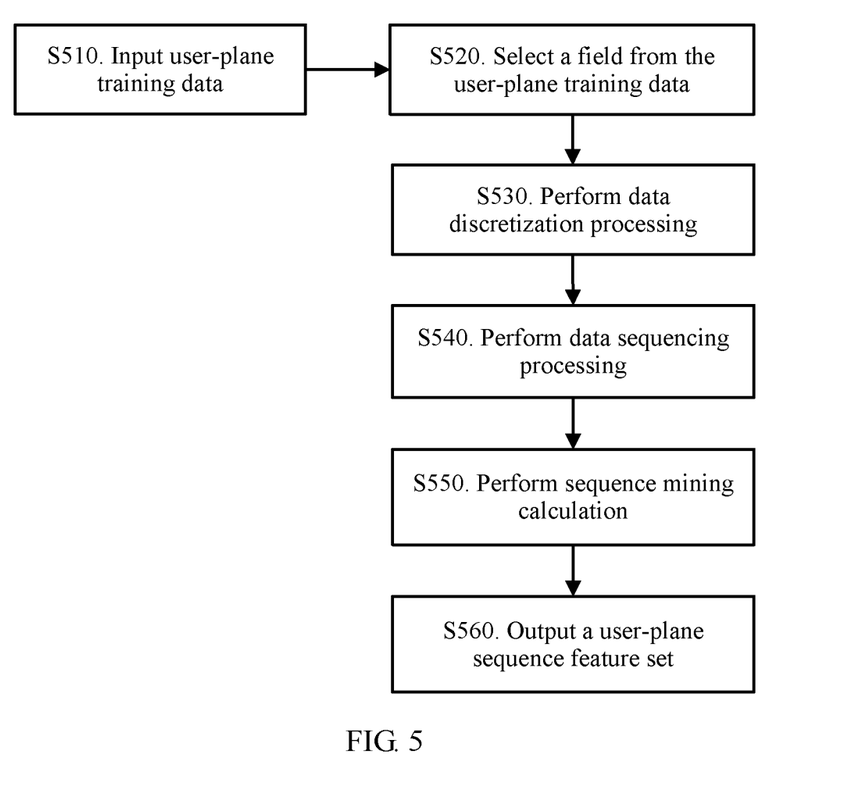
FIG. 5 is a schematic flowchart of obtaining a user-plane sequence feature set according to an embodiment of this application.

User-plane training data is processed and mined to finally obtain a user-plane sequence feature set. FIG. 5 is a schematic flowchart of obtaining a user-plane sequence feature set. The procedure may specifically include the following steps:

S510: Input user-plane training data to obtain a user-plane sequence feature set.

S520: Select a field from the user-plane training data by using the method described above.

S530: Perform data discretization processing by using the method described above.

S540: Perform data sequencing processing by using the method described above, to obtain a user training data sequence.

S550: Perform sequence mining calculation on the user training data sequence to obtain the user-plane sequence feature set, where the sequence mining calculation herein may be multi-dimension sequence mining.

S560: Output the user-plane sequence feature set.

The sequence feature set may include at least one of the predefined sequence feature set and the mined sequence feature set. The fault classification model is generated based on the correspondence or is generated by further mining the correspondence, that is, modeling the fault classification model. The generated fault classification model may be uploaded to a fault classification module, so that the fault classification model is used in the fault classification process. The fault classification model may indicate a correspondence between a fault type and each of a training feature value and an operating feature value, to help a customer service representative quickly locate a fault type for a complaining user, thereby facilitating fault recovery performed by an engineer.

A process of obtaining the sequence feature set in this embodiment of this application is described below in detail.

For the signaling-plane training data, the signaling training data sequence 11000, 11000, 32017, 26100 is obtained above. The sequence includes a plurality of subsequences:

{11000}, {32017}, {26100}
{11000, 11000}, {11000, 32017}, {32017, 26100}
{11000, 11000, 32017}, {11000, 32017, 26100}
{11000, 11000, 32017, 26100}

Then, in the method in this embodiment of this application, a sequence pattern mining (Sequence Pattern Mining) algorithm may be used to mine an element in the sequence feature set. The sequence feature set herein is a mined sequence feature set. Correspondingly, when the sequence feature set includes the mined sequence feature set, the method in this embodiment of this application may further include: performing sequence mining calculation on the training data sequence to obtain the mined sequence feature set.

A sequence pattern is defined as a set including different sequences as elements. Any two elements are different, and sub-elements in each sequence used as an element are arranged in order. A conventional sequence mining algorithm is mining a set (which is also referred to as a sequence pattern) of subsequences appearing within a relative time period or in another sequence at high frequency. The conventional sequence mining algorithm is usually limited to being applied to a discretized sequence. In the conventional sequence mining algorithm, all frequent subsequences in a mined data sequence are usually found during mining based on a minimum support degree threshold specified by the user. In other words, frequency at which the subsequences appear in the mined data sequence is not less than the minimum support degree threshold. The frequent subsequences are used as elements in the sequence pattern.

However, the conventional sequence mining algorithm is not suitable to determine the mined sequence feature set in this embodiment of this application, because in the conventional sequence mining algorithm, a subsequence is selected based on frequency at which the subsequence appears. In other words, higher frequency at which the subsequence appears indicates a higher possibility that the subsequence is selected by using the algorithm. However, in this embodiment of this application, when a fault type is being identified, a subsequence appearing at relatively low frequency but having high distinguishability can be usually used to distinguish the fault type. Therefore, in this embodiment of this application, a proper sequence mining algorithm, such as at least one of a decision tree algorithm and a model-based search tree (Model-based search Tree, MBT) algorithm, may be selected as required.

For example, when a decision tree is constructed by using the decision tree algorithm, the decision tree may be constructed based on parameters such as an information entropy and a GINI coefficient. Subsequences selected by using the decision tree algorithm may be considered as distinguishable subsequences. These subsequences are used as elements in a mined signaling sequence feature set, and certainly, are also elements in the mined sequence feature set. In the foregoing example, subsequences {26100} and {11000, 11000, 32017} may be mined from the plurality of subsequences.

A network standard, a signaling type, and a signaling status that are indicated by 26100 are respectively 4G, being attached, and being refused. Network standards, signaling types, and signaling statuses that are indicated by 11000, 11000, 32017 are respectively 3G; being attached, and succeed; 3G; being attached, and succeed; and 2G; Gb interface paging, and timeout. Both {26100} and {11000, 11000, 32017} are highly distinguishable features.

Similarly, a user training data sequence is obtained for user-plane training data of each user. For example, a user training data sequence of a user is {(A1, B1), (A2, C2), (D1, E2)}.

Subsequences corresponding to the user training data sequence may be:
  (A1), (A2), (B1), (C2), (D1), (E2)
  (A1, A2), (A1, C2), (B1, A2), (B1, C2), (A2, D1), (A2, E2), (C2, D1), (C2, E2)
  (A1, A2, D1), (A1, A2, E2), (A1, C2, D1), (A1, C2, E2), (B1, A2, D1), (B1, A2, E2), (B1, C2, D1)
  (B1, C2, E2) . . . .

A relatively highly distinguishable feature in the user training data sequence is mined by using the sequence mining algorithm from all subsequence combinations that may appear. The relatively highly distinguishable feature is used as an element in a mined user sequence feature set, and certainly, is also an element in the mined sequence feature set.

In view of the above, the performing sequence mining calculation on the training data sequence to obtain the mined sequence feature set may include: determining a plurality of training data subsequences based on the training data sequence; and performing sequence mining calculation on the plurality of training data subsequences by using the sequence mining algorithm, and determining a mined training data subsequence as an element in the mined sequence feature set.

The mined sequence feature set includes a mined signaling sequence feature set and a mined user sequence feature set. In the method in this embodiment of this application, the mined sequence feature set may be uploaded to an online feature calculation module, so that the mined sequence feature set is used when the online feature calculation module calculates an operating feature value of the user in real time.

In the method in this embodiment of this application, the sequence feature set and the fault classification model may be periodically refreshed. User identifiers of a batch of complaining users and fault time points are periodically entered, to ensure that correct and reliable fault types are sent to the offline modeling module. The offline modeling module extracts, from the detail record database, data generated by the batch of users within a plurality of preset periods corresponding to the fault time points, calculates a feature value, incrementally refreshes the fault classification model and the sequence feature set, and respectively refreshes a refreshed sequence feature set and a refreshed fault classification model to the online feature calculation module and a fault type determining module. A process of obtaining the refreshed sequence feature set and the refreshed fault classification model may be consistent with the process described above. Details are not described herein again.

According to the method for determining a fault type in this embodiment of this application, online real-time calculation is performed on the operating feature value of the operating data generated by the user, and when a user complaint is received, matching is performed between the operating feature value and the fault classification model to determine the fault type of the fault caused for the user. The procedure is online, a processing speed is high, and manual costs are low.

Figure 6:
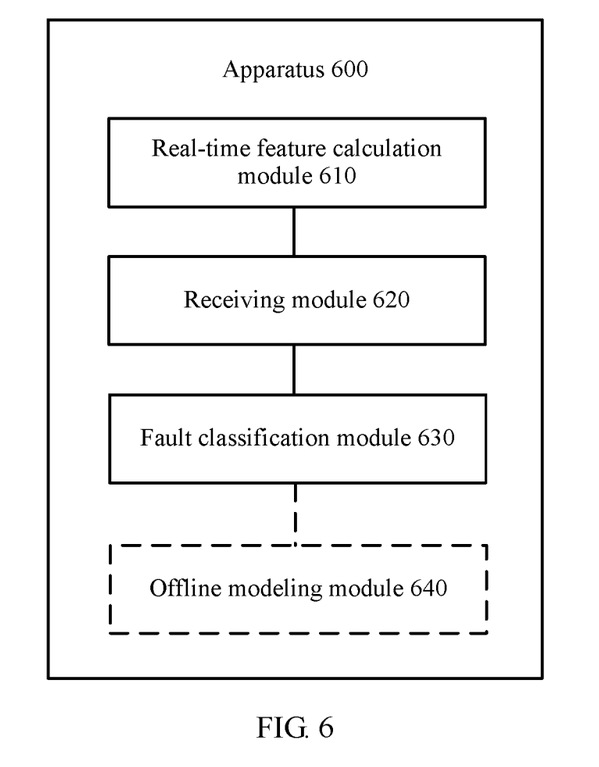
FIG. 6 is a schematic block diagram of an apparatus for determining a fault type according to an embodiment of this application.

FIG. 6 is a schematic block diagram of an apparatus 600 for determining a fault type according to an embodiment of this application. The apparatus 600 for determining a fault type may include:

a real-time feature calculation module 610, configured to perform online real-time calculation on operating data generated by each of a plurality of users within a preset period, to obtain an operating feature value corresponding to the operating data generated by each user within the preset period;

a receiving module 620, configured to receive a fault classification request, where the fault classification request is used to request to determine a fault type of a fault that is caused for a target user before a target moment, and the target user is any one of the plurality of users; and a fault classification module 630, configured to determine, based on a fault classification model and an operating feature value that is of the target user within at least one preset period, according to the fault classification request received by the receiving module 620, the fault type of the fault that is caused for the target user before the target moment, where the fault classification model is obtained by performing training based on training data of a known fault type.

According to the apparatus for determining a fault type in this embodiment of this application, online real-time calculation is performed on the operating feature value of the operating data generated by the user, and when a user complaint is received, matching is performed between the operating feature value and the fault classification model to determine the fault type of the fault caused for the user. The procedure is online, a processing speed is high, and manual costs are low.

Optionally, in an embodiment, the real-time feature calculation module 610 may be specifically configured to: obtain the operating data generated by each user within the preset period, where the operating data includes at least one of signaling-plane operating data and user-plane operating data; determine an operating data sequence based on the operating data, where the operating data sequence includes at least one of a signaling operating data sequence corresponding to the signaling-plane operating data and a user operating data sequence corresponding to the user-plane operating data; and determine, based on the operating data sequence and a sequence feature set, the operating feature value corresponding to the operating data.

Optionally, in an embodiment, the apparatus 600 may further include an offline modeling module 640, configured to: obtain the training data, where the training data includes at least one of signaling-plane training data and user-plane training data; determine a training data sequence based on the training data, where the training data sequence includes at least one of a signaling training data sequence corresponding to the signaling-plane training data and a user training data sequence corresponding to the user-plane training data; determine, based on the training data sequence and the sequence feature set, a training feature value corresponding to the training data; and determine the fault classification model based on the training feature value and the fault type that is corresponding to the training data.

Optionally, in an embodiment, the sequence feature set includes at least one of a mined sequence feature set and a predefined sequence feature set.

Optionally, in an embodiment, when the sequence feature set includes the mined sequence feature set, the offline modeling module 640 may be configured to perform sequence mining calculation on the training data sequence to obtain the mined sequence feature set.

Optionally, in an embodiment, the offline modeling module 640 may be specifically configured to: determine a plurality of training data subsequences based on the training data sequence; and perform sequence mining calculation on the plurality of training data subsequences by using a sequence mining algorithm, and determine a mined training data subsequence as an element in the mined sequence feature set.

Optionally, in an embodiment, the sequence mining algorithm includes at least one of a decision tree algorithm and a model-based search tree MBT algorithm.

Optionally, in an embodiment, the fault classification module 630 may be specifically configured to: obtain, based on the target moment, a plurality of operating feature values of the target user separately corresponding to a plurality of preset periods before the target moment; reconstruct the plurality of operating feature values to obtain a reconstructed feature value; and perform feature matching between the reconstructed feature value and the fault classification model to determine the fault type of the fault that is caused for the target user before the target moment.

It should be understood that, in this embodiment of this application, the real-time feature calculation module 610, the fault classification module 630, and the offline modeling module 640 may be implemented by a processor, and the receiving module 620 may be implemented by a network interface.

Figure 7:
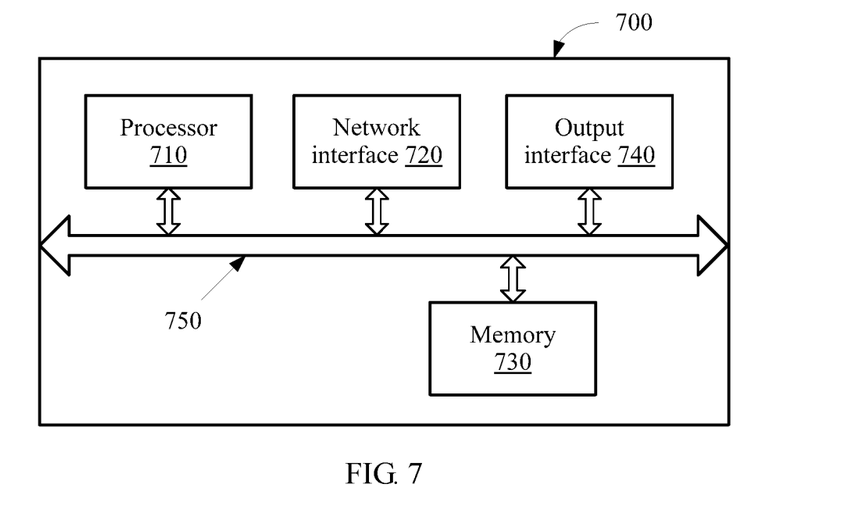
FIG. 7 is a schematic block diagram of an apparatus for determining a fault type according to another embodiment of this application.

As shown in FIG. 7, an apparatus 700 may include a processor 710, a network interface 720, and a memory 730. The memory 730 may be configured to store code executed by the processor 710, or the like. The apparatus 700 may further include an output device or an output interface 740 connected to the output device, to output a fault classification result. The output device includes a display, a printer, and the like.

Components of the apparatus 700 are coupled together by using a bus system 750. In addition to a data bus, the bus system 750 includes a power bus, a control bus, and a status signal bus.

The apparatus 600 shown in FIG. 6 or the apparatus 700 shown in FIG. 7 can implement the processes implemented in the embodiments in FIG. 1 to FIG. 5. To avoid repetition, details are not described herein again.

It should be noted that the foregoing method embodiments of this application may be applied to the processor, or implemented by the processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general purpose processor, a Digital Signal Processor, DSP, an Application-Specific Integrated Circuit, ASIC, a Field Programmable Gate Array, FPGA or another programmable logic device, a discrete gate or transistor logic device, or a discrete hardware component. It may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a Read-Only Memory, ROM, a Programmable ROM, PROM, an Erasable PROM, EPROM, an Electrically EPROM, EEPROM, or a flash memory. The volatile memory may be a Random Access Memory, RAM, used as an external cache. Through example but not limitative description, many forms of RAMs may be used, for example, a Static RAM, SRAM, a Dynamic RAM, DRAM, a Synchronous DRAM, SDRAM, a Double Data Rate SDRAM, DDR SDRAM, an Enhanced SDRAM, ESDRAM, a Synchlink DRAM, SLDRAM, and a Direct Rambus RAM, DR RAM. It should be noted that the memory of the systems and methods described in this specification includes but is not limited to these and any memory of another proper type.

The network interface is configured to receive a behavior sequence of at least one program file sent by a sandbox server in an enterprise network. Specifically, the network interface may receive an MD5 value corresponding to the program file sent by the sandbox server and the behavior sequence of the program file. There may be one or more network interfaces 1220. The network interface 1220 may receive a behavior sequence sent by one sandbox server, or may receive behavior sequences separately sent by a plurality of sandbox servers. The network interface may be a wired interface, such as a Fiber Distributed Data Interface, FDDI or a Gigabit Ethernet, GE interface. Alternatively, the network interface may be a wireless interface.

A person of ordinary skill in the art may be aware that, with reference to the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a Read-Only Memory, ROM, a Random Access Memory, RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A computer-implemented method for determining a fault type, comprising:
  obtaining operating data generated by each of a plurality of users within a preset period, wherein the operating data comprises at least one of signaling-plane operating data or user-plane operating data;
  determining an operating data sequence based on the operating data, wherein the operating data sequence comprises at least one of a signaling operating data sequence corresponding to the signaling-plane operating data or a user operating data sequence corresponding to the user-plane operating data;
  determining, based on the operating data sequence and a sequence feature set, an operating feature value corresponding to each element in the sequence feature set, wherein the sequence feature set is a set of a plurality of features that represents a fault type and is obtained by performing sequence mining based on the training data of the known fault type;
  receiving a fault classification request, wherein the fault classification request requests to determine a fault type of a fault that is caused for a target user before a target moment, and the target user is any one of the plurality of users; and
  determining, according to the fault classification request, the fault type of the fault that is caused for the target user before the target moment based on a fault classification model and an operating feature value of the target user within at least one preset period, wherein the fault classification model is obtained by performing training based on the sequence feature set and a known fault type that is corresponding to training data of a known fault.

2. The method according to claim 1, wherein the method further comprises:
  obtaining the training data, wherein the training data comprises at least one of signaling-plane training data and user-plane training data;
  determining a training data sequence based on the training data, wherein the training data sequence comprises at least one of a signaling training data sequence corresponding to the signaling-plane training data and a user training data sequence corresponding to the user-plane training data;

determining, based on the training data sequence and the sequence feature set, a training feature value corresponding to the training data; and determining the fault classification model based on the training feature value and the fault type that is corresponding to the training data.

3. The method according to claim 2, wherein the method further comprises:

determining a plurality of training data subsequences based on the training data sequence;

performing sequence mining calculation on the plurality of training data subsequences using a sequence mining algorithm; and determining a mined training data subsequence as an element in the sequence feature set.

4. The method according to claim 3, wherein the sequence mining algorithm comprises at least one of a decision tree algorithm or a model-based search tree, MBT algorithm.

5. The method according to claim 1, wherein the determining, according to the fault classification request, the fault type of the fault that is caused for the target user before the target moment based on a fault classification model and an operating feature value that is of the target user within at least one preset period comprises:

obtaining, based on the target moment, a plurality of operating feature values of the target user separately corresponding to a plurality of preset periods before the target moment;

reconstructing the plurality of operating feature values to obtain a reconstructed feature value; and performing feature matching between the reconstructed feature value and the fault classification model to determine the fault type of the fault that is caused for the target user before the target moment.

6. An apparatus for determining a fault type, comprising:
at least one processor;
a non-transitory computer-readable storage medium coupled to the at least one processor and storing programming instructions for execution by the at least one processor, wherein the programming instructions instruct the at least one processor to:

obtaining operating data generated by each of a plurality of users within a preset period, wherein the operating data comprises at least one of signaling-plane operating data and user-plane operating data;

determining an operating data sequence based on the operating data, wherein the operating data sequence comprises at least one of a signaling operating data sequence corresponding to the signaling-plane operating data and a user operating data sequence corresponding to the user-plane operating data;

determining, based on the operating data sequence and a sequence feature set, an operating feature value corresponding to each element in the sequence feature set, wherein the sequence feature set is a set of a plurality of features that represents a fault type and is obtained by performing sequence mining based on the training data of the known fault type;

receive a fault classification request, wherein the fault classification request requests to determine a fault type of a fault that is caused for a target user before a target moment, and the target user is any one of the plurality of users; and determine, according to the fault classification request, the fault type of the fault that is caused for the target user before the target moment based on a fault classification model and an operating feature value that is of the target user within at least one preset period, wherein the fault classification model is obtained by performing training based on the sequence feature set and a known fault type that is corresponding to training data of a known fault.

7. The apparatus according to claim 6, wherein the programming instructions instruct the at least one processor to:

obtain the training data, wherein the training data comprises at least one of signaling-plane training data and user-plane training data;

determine a training data sequence based on the training data, wherein the training data sequence comprises at least one of a signaling training data sequence corresponding to the signaling-plane training data and a user training data sequence corresponding to the user-plane training data;

determine, based on the training data sequence and the sequence feature set, a training feature value corresponding to the training data; and determine the fault classification model based on the training feature value and the fault type that is corresponding to the training data.

8. The apparatus according to claim 7, wherein the programming instructions instruct the at least one processor to:

determine a plurality of training data subsequences based on the training data sequence;

perform sequence mining calculation on the plurality of training data subsequences using a sequence mining algorithm; and determine a mined training data subsequence as an element in the sequence feature set.

9. The apparatus according to claim 8, wherein the sequence mining algorithm comprises at least one of a decision tree algorithm or a model-based search tree MBT algorithm.

10. The apparatus according to claim 6, wherein the programming instructions instruct the at least one processor to:

obtain, based on the target moment, a plurality of operating feature values of the target user separately corresponding to a plurality of preset periods before the target moment;

reconstruct the plurality of operating feature values to obtain a reconstructed feature value; and perform feature matching between the reconstructed feature value and the fault classification model to determine the fault type of the fault that is caused for the target user before the target moment.

11. A non-transitory computer-readable medium with a set of instructions stored thereon, which when executed, cause at least one processor to perform operations comprising:

obtaining operating data generated by each of a plurality of users within a preset period, wherein the operating data comprises at least one of signaling-plane operating data or user-plane operating data;

determining an operating data sequence based on the operating data, wherein the operating data sequence comprises at least one of a signaling operating data sequence corresponding to the signaling-plane operating data or a user operating data sequence corresponding to the user-plane operating data;

determining, based on the operating data sequence and a sequence feature set, an operating feature value corresponding to each element in the sequence feature set, wherein the sequence feature set is a set of a plurality of features that represents a fault type and is obtained by performing sequence mining based on the training data of the known fault type;

receiving a fault classification request, wherein the fault classification request requests to determine a fault type of a fault that is caused for a target user before a target moment, and the target user is any one of the plurality of users; and determining, according to the fault classification request, the fault type of the fault that is caused for the target user before the target moment based on a fault classification model and an operating feature value of the target user within at least one preset period, wherein the fault classification model is obtained by performing training based on the sequence feature set and a known fault type that is corresponding to training data of a known fault.

12. The non-transitory computer-readable medium according to claim 11, wherein the operations further comprise:

obtaining the training data, wherein the training data comprises at least one of signaling-plane training data and user-plane training data;

determining a training data sequence based on the training data, wherein the training data sequence comprises at least one of a signaling training data sequence corresponding to the signaling-plane training data and a user training data sequence corresponding to the user-plane training data;

determining, based on the training data sequence and the sequence feature set, a training feature value corresponding to the training data; and determining the fault classification model based on the training feature value and the fault type that is corresponding to the training data.

13. The non-transitory computer-readable medium according to claim 12, wherein the operations further comprise:

determining a plurality of training data subsequences based on the training data sequence;

performing sequence mining calculation on the plurality of training data subsequences using a sequence mining algorithm; and determining a mined training data subsequence as an element in the sequence feature set.

14. The non-transitory computer-readable medium according to claim 13, wherein the sequence mining algorithm comprises at least one of a decision tree algorithm or a model-based search tree, MBT algorithm.

15. The non-transitory computer-readable medium according to claim 11, wherein the determining, according to the fault classification request, the fault type of the fault that is caused for the target user before the target moment based on a fault classification model and an operating feature value that is of the target user within at least one preset period comprises:

obtaining, based on the target moment, a plurality of operating feature values of the target user separately corresponding to a plurality of preset periods before the target moment;

reconstructing the plurality of operating feature values to obtain a reconstructed feature value; and performing feature matching between the reconstructed feature value and the fault classification model to determine the fault type of the fault that is caused for the target user before the target moment.

* * * * *